United States Patent Office 2,708,418
Patented May 17, 1955

2,708,418

ANIMAL BEDDING

Nathan Sugarman and William Raymond Tooke, Jr., Atlanta, Ga., assignors, by direct and mesne assignments, to Carr E. Johnston, Lithonia, Ga.

No Drawing. Application April 12, 1950,
Serial No. 155,556

8 Claims. (Cl. 119—1)

This invention relates to a bedding material for poultry and animals. More particularly, our invention relates to a bedding material for use in the housing of poultry, and adapted particularly to absorb liquids and other excrement.

As a feature of our invention, we provide a bedding material manufactured from paper pulp, and preferably small pieces of paper pulp adapted to absorb rapidly any liquid resulting from animal excrement. We have found that bedding material manufactured in accordance with the contribution of our invention is particularly capable of drying within a short period of time, and when dry, is completely dust-free and highly resistant to disintegration to dust under the constant scratching of poultry.

We have also found that bedding material formed of paper pulp in accordance with the teachings of our invention, lends itself to the ready sifting of dried droppings that can therefore be removed quite easily. Further, the bedding material of our invention is readily adapted to contain therein a disinfectant, germicide, fungicide, or some similar agent for the purposes of preventing mold formation and inhibiting the growth of disease-producing organisms. In addition, our bedding material is extremely unattractive to rodents and flies, and lends itself to coloring in a manner that is pleasing to poultry and therefore tends to prevent cannibalism.

As a further feature of our invention, the paper pulp is made under conditions whereby it contains a slight excess of some acid such as phosphoric acid, it being the purpose of the excess acidity to neutralize and combine with any ammonia formed by the decomposition of the excrement. While other acids may be used, we have chosen phosphoric acid because of the additional added value of the phosphorus when the used litter and the manure is utilized as a fertilizer.

As a still further feature of our invention, the pulp is formed in the presence of a suitable detergent and wetting agent, such as sodium silicate, although other materials, such as sodium hydroxide, are quite acceptable. As a further feature of this part of our invention, the pulp is obtained by the repulping of waste paper. Of course, other surface-active wetting and penetrating agents may also be used to assist in the forming of the pulp.

The sodium silicate, in the presence of which the pulp is formed through the repulping of waste paper, is useful also as a binder and an adhesive. Thereby, when the pulp is dry, the wet strength of the material is greatly increased. More particularly, the rapid moisture absorption of the finished pulp product of our invention is in great part due to the presence specifically of sodium silicate, although other materials will contribute relatively rapid moisture absorption, but to a lesser degree than is possible through sodium silicate, which we have found has particularly unique properties in this direction. One other particular wetting agent that gives results of a similar character is Aerosol, and there are others that will function for the purpose. However, in the sodium silicate we combine in a single cheap chemical material the functions of a binder and adhesive, a wetting agent in repulping, and a wetting agent in the finished product.

In the actual production of the material of our invention we have found that the following proportions of materials will produce an exceedingly effective product. Thus, we take 200 parts of waste paper and repulp them in any suitable apparatus in the presence of 8,000 parts of water containing 100 parts of 42° Baumé sodium silicate, 0.5 part of sodium pentachlorophenate, and 0.5 part dyestuff. Preferably, a rose color dye is added so that the final product will be rose colored and pleasing to the poultry, thereby decreasing cannibalism. The pulp slurry is formed into pulp-board sheets, and the sheets are then dried and cut to the desired size on a slitting and chopping machine. The sheets may be slit and chopped before drying with the same results. We have formed pieces measuring 1" x 5/8" x 5/16", and also pieces measuring 1" x 3/8" x 3/16". Pieces thus formed have an extremely high absorptivity for moisture as is evidenced by the fact that water dropped on the surfaces of the pulp pieces is immediately absorbed into the material. The pulp litter, after soaking in water for twenty-four hours, will upon exposure to the air, dry completely in two or three days.

We are well aware of the fact that sugarcane bagasse has been used as animal bedding, and we have compared our bedding to sugarcane bagasse bedding. We have discovered that while the bagasse was completely broken and made dusty by the scratching of poultry, our bedding material remained completely dust-free for a period of several weeks. Further, we have observed that when the droppings from poultry fall on our bedding material, the moisture is immediately absorbed by the pulp, allowing the solid material of the droppings to dry rapidly so as to be capable of sifting from the bedding. Thus, the dried solid manure material readily sifts down through the pieces of dry pulp leaving the pulp at the top in proper condition for further action. This is not true of the bagasse.

As was indicated earlier, our bedding material has little if any attraction for flies, and in comparative tests, flies were attracted to bagasse material forming a litter, but few if any flies were attracted to a chicken coop equipped with our bedding material.

We believe that the basis of our invention and the nature of our contribution to the art will now be fully appreciated by those skilled in the art.

We claim:

1. A bedding material for poultry and animals adapted to absorb rapidly any liquid resulting from animal excrement while retaining its strength, to dry within a short time for reuse and when dry to be relatively dust free and highly resistant to disintegration, consisting of small pieces of paper in the nature of 1/16" thick and 3/8" square inch in area, said paper having been formed of disintegrated paper stock in the presence of a binder, adhesive and wetting agent.

2. A bedding material for poultry and animals adapted to absorb rapidly any liquid resulting from animal excrement while retaining its strength, to dry within a short time for reuse and when dry to be relatively dust free and highly resistant to disintegration, consisting of small pieces of cardboard paper in the nature of 3/8" square inch in area, said paper having been formed from a pulp of disintegrated paper stock with sodium silicate as a binder.

3. A bedding material for poultry and animals adapted to absorb rapidly any liquid resulting from animal excrement, to dry within a short time for reuse and when dry to be relatively dust free and highly resistant to disintegration, consisting of pieces of cardboard paper that has been formed from a disintegrated paper stock with an alkali acting as a combined binder, adhesive and wetting agent.

4. A bedding material for poultry and animals adapted to absorb rapidly any liquid resulting from animal excrement while retaining its strength, to dry within a short time for reuse and when dry to be relatively dust free and highly resistant to disintegration, consisting of small pieces of paper carboard in the nature of 9/128 cubic inch in volume, said paper having been formed of disintegrated paper stock with sodium silicate acting as a combined binder, adhesive and wetting agent.

5. A bedding material for poultry and animals adapted to absorb rapidly any liquid resulting from animal excrement, to dry within a short time for reuse and when dry to be relatively dust free and highly resistant to disintegration, comprising small pieces of cardboard paper, said paper having been formed from a pulp of disintegrated paper stock with sodium silicate acting as a combined binder, adhesive and wetting agent.

6. A bedding material for poultry and animals adapted to absorb rapidly any liquid resulting from animal excrement while retaining its strength, to dry within a short time for reuse and when dry to be relatively dust free and highly resistant to disintegration, consisting of pieces of paper in the nature of 1" x 3/8" x 3/16" to 1" x 5/8" x 5/16" cut from a paper sheet that has been formed from a pulp of disintegrated paper stock with substantially 100 parts sodium silicate to 200 parts of waste paper and with the sodium silicate acting as a combined binder, adhesive and wetting agent.

7. A bedding material for poultry and animals adapted to have great wet strength and absorb rapidly any liquid resulting from animal excrement, to dry within a short time for reuse and when dry to be relatively dust free and highly resistant to disintegration, consisting of small pieces of dry cardboard paper that has been formed from a pulp of disintegrated paper with sodium silicate acting as a combined binder, adhesive and wetting agent.

8. A bedding material for animals comprising small pieces of paper in the nature of 1" x 3/8" x 3/16", said paper having been formed from a pulp of disintegrated paper stock with sodium silicate as a binder.

References Cited in the file of this patent

UNITED STATES PATENTS

| Number | Name | Date |
|---|---|---|
| 1,165,062 | Borzner | Dec. 21, 1915 |
| 1,796,794 | Koppelman | Mar. 17, 1931 |
| 2,028,080 | Stern | Jan. 14, 1936 |
| 2,035,286 | Wenzel | Mar. 24, 1936 |
| 2,077,059 | Snyder et al. | Apr. 13, 1937 |
| 2,179,591 | Godchaux | Nov. 14, 1939 |
| 2,243,296 | Sweetland | May 27, 1941 |
| 2,340,728 | Baker et al. | Feb. 1, 1944 |
| 2,376,672 | Dreyling | May 22, 1945 |
| 2,531,504 | Dillehay et al. | Nov. 28, 1950 |